US009533260B2

(12) United States Patent
Perera Mercado et al.

(10) Patent No.: US 9,533,260 B2
(45) Date of Patent: Jan. 3, 2017

(54) METHOD AND SYSTEM FOR OBTAINING SWEET GAS, SYNTHETIC GAS AND SULPHUR FROM NATURAL GAS

(71) Applicants: CENTRO DE INVESTIGACION EN QUIMICA APLICADA, Saltillo, Coahuila (MX); CENTRO DE INVESTIGACION CIENTIFICA DE YUCATAN, A. C., Merida, Yucatan (MX); INSTITUTO NACIONAL DE INVESTIGACIONES NUCLEARES, Ocoyoacac, Estado de Mexico (MX)

(72) Inventors: Yibran Argenis Perera Mercado, Ramos Arizpe (MX); Luis Alfonso Garcia Cerda, Saltillo (MX); Griselda Castruita De Leon, Saltillo (MX); Luis Alberto Villarreal Cardenas, Saltillo (MX); Maria Guadalupe Neira Velazquez, Saltillo (MX); Manuel de Jesus Aguilar Vega, Merida (MX); Maria Isabel de los Dolores Loria Bastarrachea, Merida (MX); Jose Luis Santiago Garcia, Merida (MX); Alejandra Aimee Gutierrez Mejia, Merida (MX); Joel Osvaldo Pacheco Sotelo, Metepec (MX); Marquidia Josseline Pacheco Pacheco, Toluca (MX); Ricardo Valdivia Barrientos, Toluca (MX); Jose Fidel Ramos Flores, Toluca (MX); Miguel Angel Duran Garcia, Toluca (MX); Miguel Angel Hidalgo Perez, Ixtapalapa (MX)

(73) Assignees: CENTRO DE INVESTIGACION EN QUIMICA APLICADA, Saltillo, Coahuila (MX); CENTRO DE INVESTIGACION CIENTIFICA DE YUCATAN, A. C., Merida, Yucatan (MX); INSTITUTO NACIONAL DE INVESTIGACIONES NUCLEARES, Ocoyoacac, Estado de Mexico (MX)

(*) Notice: Subject to any disclaimer, the term of this patent is extended or adjusted under 35 U.S.C. 154(b) by 26 days.

(21) Appl. No.: 13/935,313

(22) Filed: Jul. 3, 2013

(65) Prior Publication Data
US 2015/0008368 A1    Jan. 8, 2015

(51) Int. Cl.
*B01J 19/08* (2006.01)
*C01B 17/04* (2006.01)
(Continued)

(52) U.S. Cl.
CPC ............ *B01D 63/00* (2013.01); *B01D 53/228* (2013.01); *B01D 71/54* (2013.01); *B01J 19/088* (2013.01);
(Continued)

(58) Field of Classification Search
CPC ............ B01D 53/1431; B01D 53/1462; B01D 53/1456; B01D 63/00; C07C 7/144; C01B 3/06; C01B 17/0495; C01B 3/501; C10L 3/10; Y02C 10/06; Y02C 10/08; Y02C 10/10
See application file for complete search history.

(56) References Cited

U.S. PATENT DOCUMENTS

5,843,395 A * 12/1998 Wang .......................... 423/573.1
6,814,780 B2 * 11/2004 Bikson et al. ................... 95/51
(Continued)

FOREIGN PATENT DOCUMENTS

| WO | 92/20431 A1 | 11/1992 |
| WO | 00/56441 A1 | 9/2000 |
| WO | 2007/022595 A1 | 3/2007 |

OTHER PUBLICATIONS

International Search Report for International Application No. PCT/MX2013/000080, mailed Oct. 25, 2013.

*Primary Examiner* — Stanley Silverman
*Assistant Examiner* — Syed Iqbal (57) ABSTRACT

A method for obtaining sweet gas, synthetic gas, and sulphur from natural gas. The method includes the steps of removing impurities from the natural gas for obtaining pre-treated natural gas; sweetening the pre-treated natural gas through a separation using a plurality of membranes for obtaining sweet gas and acid gases; ionizing the acid gases to dissociate them into sulphur and synthetic gas with remnants of acid gases; and neutralizing the synthetic gas with remnants of acid gases for generating sweet gas. Likewise, a system is presented on how to implement the method.

10 Claims, 5 Drawing Sheets

(51) Int. Cl.
| | | |
|---|---|---|
| *C01B 3/06* | (2006.01) | |
| *C07C 7/144* | (2006.01) | |
| *B01D 63/00* | (2006.01) | |
| *B01D 53/22* | (2006.01) | |
| *B01D 71/54* | (2006.01) | |
| *C10L 3/10* | (2006.01) | |
| *C01B 3/04* | (2006.01) | |

(52) U.S. Cl.
CPC ............. *C01B 3/04* (2013.01); *C01B 17/0495* (2013.01); *C10L 3/103* (2013.01); *B01J 2219/00006* (2013.01); *B01J 2219/0871* (2013.01); *B01J 2219/0875* (2013.01); *B01J 2219/0894* (2013.01); *C10L 3/104* (2013.01); *C10L 3/105* (2013.01); *Y02E 60/364* (2013.01)

(56) References Cited

U.S. PATENT DOCUMENTS

| | | | |
|---|---|---|---|
| 7,455,828 B2* | 11/2008 | Selinger et al. | 423/648.1 |
| 8,669,294 B2* | 3/2014 | Lien et al. | 518/700 |
| 2008/0056971 A1* | 3/2008 | Hughes | 423/220 |

* cited by examiner

METHOD AND SYSTEM FOR OBTAINING SWEET GAS, SYNTHETIC GAS AND SULPHUR FROM NATURAL GAS

TECHNICAL FIELD OF THE INVENTION

This invention is related to the techniques used to obtain gases and products derived from natural gas; more specifically, it refers to a method and a system for obtaining sweet gas, synthetic gas, and sulphur from natural gas.

BACKGROUND OF THE INVENTION

Sweetening is the main process to which natural gas streams are subject to for the purpose of removing the acid gases it contains. The removal of said gases is essential for many reasons; one of those reasons is that they decrease the heat capacity of $CH_4$. $CO_2$ and $H_2S$ are highly corrosive acid gases; additionally, $CO_2$ is considered one of the main greenhouse effect gases that contribute to global warming. On its part $H_2S$ is extremely toxic and fatal even in low concentrations. The conventionally known process used for the removal of acid gases implies chemical adsorption with amines. However, this process requires subsequent desorption to release the gases that had been removed, which are then burned or taken to the Claus process to recover the elemental sulphur and water. The technology used to selectively separate the acid gases using membranes is currently an attractive option to carry out the natural gas sweetening.

For the case of $H_2S$ separation from natural gas streams using membranes, literature is scarce. However, certain references can be found for this separation using copolymers of Poly(ether-urethane) and Poly(ether-urethane-urea) written by Chattarje et al [Chatterjee G., Houde A. A., Stern S. A., (1997), Poly(ether urethane) and Poly(ether urethane urea) Membranes with High $H_2S/CH_4$ selectivity, Journal of Membrane Science, 135, 99-106] who prepared the membranes with different polyethers and they found that it is possible to achieve separation factors close to 100 for $H_2S/CH_4$ in mixtures containing different $CH_4:CO_2:H_2S$ concentrations. This factor indicates that around 100 $H_2S$ molecules would flow through the membrane for every $CH_4$ molecule, thus effectively concentrating the $CH_4$ in the injection section of the gas, and receiving a mixture with very high $H_2S$ concentration at the membrane's bottom part. In another report about the separation of the same gases using a polyphosphazene membrane, permeability results report $H_2S/CH_4$ separation factors of about 75 [C. J. Orme, F. F. Stewa, (2005) Mixed gas hydrogen sulfide permeability and separation using supported polyphosphazene membranes, Journal of Membrane Science, 253, 1-2, 243-249].

Other studies have focused on aided transport processes in which the membranes are formed, for example, from a sulfonated ionic polymer containing an alcohol amine dissolved in the material, which acts as a carrier within the membrane to take the $CO_2$ & $H_2S$ acid gases and transport them through the membrane [J. D. Way, R. D. Noble, (1989) Competitive facilitated transport of acid gases in perfluorosulfonic acid membranes, Journal of Membrane Science, 46, 2-3, 309-324]. Recently, Huang J. et al [Huang J., Zoe J., Winston Hoe W. S., (2008), Carbon Dioxide Capture Using $CO_2$-Selective Facilitated Transport Membrane, Ind. Eng. Chem. Res., 47, 1261-1267] describe the aided transport of $CO_2$ through the use of amines in a crosslinked matrix of vinyl alcohol, PVA, with amino groups joined to the polymer chain and free amines within the matrix. These membranes show good selectivity for the separation of $H_2S$ from the natural gas streams; however, given the nature of the aided transport, the flow through them takes a long time, which makes their use unfeasible for the separation in large volume streams of natural gas. Because of this, membranes with high flow of gas and capable of separating $H_2S$ from $CH_4$ in ratios of at least 30 to 1 shall be included.

There is a larger number of reported works for the case of separation of $CO_2$ from natural gas streams. Recently, Lin H. et al. [Lin H., Freeman B. D. (2005) Materials selection guidelines for membranes that remove $CO_2$ from gas mixtures. Journal of Molecular Structure 739:57-74], published a revision about the selection of polymer materials with the capacity to form membranes for the separation of $CO_2$ from gas mixtures. They suggest that in order to improve the permeability and selectivity properties of polymer membranes, the interaction between $CO_2$ and the polymer needs to be increased through the incorporation of several polar groups; suggesting that the ethylene oxide (EO) units can be useful groups to achieve this objective. However, the poly (ethylene oxide) (PEO) shows a strong tendency to crystallize, consequently, it shows low permeability for gases [Lin H., Freeman B. D. (2004) Gas solubility, diffusivity and permeability in poly(ethylene oxide). Journal of Membrane Science 239:105-117].

Some block copolymers that contain polyether segments (EO units) have been studied as alternative materials to improve $CO_2$ transport properties [Car A., Stropnik C., Yave W., Peinemann K-V. (2008) PEG modified poly(amide-b-ethylene oxide) membranes for $CO_2$ separation. Journal of Membrane Science 307:88-95.; Chen J. C., Feng X., Penlidis A. (2004) Gas permeation through poly(ether-b-amide) (PEBAX 2533) block copolymer membranes. Separation Science and Technology 39:149-164; Liu L., Chakma A., Feng X. (2004) Preparation of hollow fiber poly(ether block amide)/polysulfone composite membranes for separation of carbon dioxide from nitrogen. Chemical Engineering Journal 105:43-51.; Barbi B., Furani S. S., Gehrke R., Scharnagl N., Stribeck N. (2003) SAXS and the gas transport in polyether-block-polyamide copolymer membranes. Macromolecules 36: 749-758.; Kim J. H., Ha S. Y., Lee Y. M. (2001) Gas permeation of poly(amide-6-b-ethylen oxide) copolymer. Journal of Membrane Science 190:179-193.; Bondar V. I., Freeman B. D. Pinnau I. (2000) Gas transport properties of poly(ether-b-amide) segmented block copolymers. Journal of Polymer Science. Part B: Polymer Physics 38: 2051-2062]. In the copolymers known as PEBAX®, that contain an aliphatic polyamide as rigid segment (Ex: Nylon-6, Nylon-12, PA) and a polyether as a soft segment (Ex: poly(ethylene oxide, PEO, or poly (tetramethylene oxide, PTMO)). It has been reported that PA segments provide the mechanical properties, while gas transport occurs through the PEO segment [Bondar V. I., Freeman B. D. Pinnau I. (2000) Gas transport properties of poly(ether-b-amide) segmented block copolymers. Journal of Polymer Science. Part B: Polymer Physics 38: 2051-2062].

In light of the results obtained by incorporating EO units in aliphatic polyamides, other researchers have reported the transport properties of $CO_2$ in segmented polyether (PEO) based membranes that are copolymerized with other polymer systems [Muñoz D. M., Maya E. M., de Abajo J., de la Campa J. G., Lozano A. E. (2008) Thermal treatment of poly(ethylene oxide)-segmented copolyimide based membranes: An effective way to improve the gas separation properties. Journal of Membrane Science 323: 53-59; Yoshino M., Ito K., Kita H., Okamoto K-I. (2000) Effects of hard-segment polymers on $CO_2/N_2$ gas-separation properties of poly(ethylene oxide)-segmented copolymers. Journal of Polymer Science: Part B: Polymer Physics 38:1707-1715].

In some processes, such as the one described in the patent EP2234697, a configuration that involves, at least, a two-step separation sequence in membrane units to produce a relatively pure methane gas stream with less content of pollutants than the entering gas is required. In these cases, the multi-step separation is justified by the fact that there is a lower loss of hydrocarbons in the permeated stream, as described in the publication of the international patent application WO2012012129. In the publication of the patent application US 20060042463, even though the permeated gas is recycled through a second membrane system, the result is still an acid stream with relatively high methane content, about 30% to 50% molar, which is used as fuel for an electric power generator.

On the other hand, in the publication of the patent application US20070272079, the membranes used in the separation steps of natural gas are selective for the passage of $CO_2$ showing high permeability for $CH_4$, at least in a 10/1 GPU ratio, which results in the recovery of up to 90% of methane gas. However, a well known fact is that natural gas streams are contaminated with both $CO_2$ and $H_2S$; consequently, it is essential to consider the removal of $H_2S$ in order to obtain a $CH_4$ stream at the conditions required for commercial use.

On the other hand, the use of plasma for the production of hydrogen from the decomposition of $H_2S$ has already been implemented at a semi-industrial level by Balebanov et al in Orenburg, Russia [Balebanov A. V., Givitov V. K., Krasheninnikok E. G., Nester S. A., Potapkin B. V., Rusanov V. D., Samarin A. E., Fridman A., Shulakova E. V., (1989), High Energy Chemistry (Khimia Vysokikh Energij). Sov. Phys., 5, 440], using systems consisting of 4 microwave discharge ports whose power is 250 kW resulting in 1 MW of total net power. After the discharge zone, the reactor has a condenser attached to it where the elemental sulphur, $H_2$ gas, and residual $H_2S$ are separated. Its performance depends on its adaptation to the purification process of natural gas with amines and it can even be linked to the Claus process.

Likewise, the pulsed corona discharge reported by Zhaoa G. et al. [Zhaoa G. B., Sanil J., Ji-Jun Z., Hamannb J. C., Muknahallipatnab S. S., Stanislaw L., Ackermana J. F., Argyle M. D., (2007), Production of hydrogen and sulphur from hydrogen sulfide in a non-thermal-plasma pulsed corona discharge reactor, Chemical Engineering Science, 62, 2216-2227] and Sanil J. et al. [Sanil J., Hamann J., Suresh S., Legowski S., Ackerman J. F., Argyle M. D., (2009), Energy Efficiency of hydrogen sulfide decomposition in a pulsed corona discharge reactor, Chemical Engineering Science, 64, 4826-4834], has been used for the treatment of $H_2S$. This treatment is basically carried out in a quartz reactor to which an Argon-Nitrogen mixture is added to achieve a moderately efficient decomposition of $H_2S$. This method has limitations with respect to the low concentration of $H_2S$ (<2% mol), high energy consumption (>100 eV/$H_2S$) and the need to add mixtures with other gases (Helium, Nitrogen, Hydrogen, and Argon) in order to increase its energy efficiency.

Another method used to treat $H_2S$ using plasma technology, is the discharge by radio frequency (R.F.), which consists of generating a high frequency signal (MHz) at very low pressures (from 10 to 50 kPa) in order to achieve non-equilibrium conditions. Some developments reported by Potapkin et al. [Potapkin B. V., Strelkova M. I., Fridman A. A., Harkness J. B. L., Doctor R. D., (1995), Mechanism and kinetics of $H_2S$—$CO_2$ mixture dissociation in plasma of a microwave discharge, in: J. V. Heberlein, d. W. Ernie, J. T. Roberts, (Eds.), Proceeding of the 12th International Symposium on Plasma Chemistry, 1737-1742] about the decomposition of an $H_2S$—$CO_2$ mixture in a magnetically coupled R.F. plasma, show a theoretical dissociation rate of 91%, applying 2.3 kWh/m$^3$ of specific energy. The disadvantage of this technology is that it requires the use of reduced pressure which does not allow the work with continuous flow of gases.

On the other hand, U.S. Pat. No. 5,211,923 focuses a plasma discharge on the production of $H_2$ and sulphur from acid gas that contains $H_2S$ residues and one or more COS, $CS_2$ & $SO_2$. The plasma type used in its process is R.F. operating in the microwave range and working within a pressure range of 0.5 to 2 atm. The temperature range reached with this type of plasma is from 150° C. to 450° C. Worth mentioning is the fact that this patent requires a pre-ionized Argon inlet system and a pre-heating system for the gas to be treated. Additionally, the system needs a cooling system that uses water that is not recycled but is released to the atmosphere.

Regarding $CO_2$, the avant-garde technologies used for its degradation focus on those developed for cold plasma because of its excellent dissociation results. For example: the reduction of $CO_2$ by Dielectric Barrier Discharge reported by Zheng et al. [Zheng G., Jiang J., Wu Y., Zhang R., Hou H., (2003), The Mutal conversion of $CO_2$ and CO in Dielectric Barrier Discharge (DBD), Plasma Chemistry and Plasma Processing, 23, 59-68], and, especially, the reduction of $CO_2$ using Gliding Arc Plasma in its non-equilibrium state reported by Idarto A. [Indarto A., (2007), Kinetics of $CO_2$ Reduction by Gliding arc Plasma, Asian Journal of Water Environment and Pollution, 4, 191-194].

It is precisely the gliding arc discharge the one that offers more advantages for the decomposition of toxic and hazardous gases having a strong chemical structure. One example of gliding arc discharge applied in the treatment of $H_2S$, is the one carried out by Czernichowski A. [Czernichowski A., (1998), Plasma pour valorization totale ou partiele des gaz contenant de L'$H_2S$, Revue de L'Institut Fraçais du Pétrole, 53, 163-179], who achieved an efficiency value of around 36% in the degradation of $H_2S$ using a power source based on an 8 kV, 50 Hz, 3-phase transformer with power consumption of approximately 2.4 kW.

In light of the above, it is therefore necessary to provide a method and a system to obtain sweet gas, synthetic gas, and sulphur from natural gas, through the use of highly selective membranes for $CO_2$ & $H_2S$ in order to generate sweet gas, synthetic gas, and sulphur in a way that prevents pollution of the environment through the release of $CO_2$ & $SO_2$ into the atmosphere, and, at the same time, offer the possibility of transforming an acid gases stream into a synthetic gas steam and sulphur, which does not only allow for natural gas sweetening, but also offers the conversion of acid gases into value added products through the use of a hybrid plasma reactor.

SUMMARY OF THE INVENTION

In the light of what is mentioned above, and for the purpose of offering a solution for the limitations found, the object of the invention is to provide a method for obtaining sweet gas, synthetic gas, and sulphur from natural gas; this method includes the steps of removing impurities from the natural gas for obtaining pre-treated natural gas; sweetening the pre-treated natural gas through separation using a plurality of membranes for obtaining natural gas and acid gases; ionizing the acid gases to dissociate them into sulphur and synthetic gas with remnants of acid gases; and neutralizing the synthetic gas with remnants of acid gases for generating synthetic gas.

The object of this invention is also to provide a system for obtaining sweet gas, synthetic gas, and sulphur from natural gas, the system includes a separator; a coalescing filter connected in parallel to the separator; a plurality of membranes connected to the coalescing filter, the membranes are made of polymers selected from a group consisting of polyimides, polybenzimidazole, polyamides, polyethers, polyurethanes, polyureas and combinations thereof; a hybrid plasma reactor connected to the plurality of membranes; and a plurality of bubbling columns connected to the hybrid plasma reactor which contains a neutralizing agent.

In the method and system of this invention, the natural gas sweetening is carried out through membranes, following a solution-diffusion mechanism where the acid gases selectively permeate through the membranes. Two effluents are obtained as a result of this separation: a sweet gas stream enriched with $CH_4$, and an acid gases stream that is later treated in a hybrid plasma reactor in order to obtain high value-added products like sulphur and synthetic gas. The latter is purified in bubbling columns that contain a neutralizing agent, making the production of synthetic gas possible in the required conditions to be used for the generation of electric power within the same method.

BRIEF DESCRIPTION OF THE FIGURES

The particular details of this invention are described in the following paragraphs, together with the accompanying figures, which are presented for the purpose of defining the invention, but without limiting its scope.

DETAILED DESCRIPTION OF THE INVENTION

Method for Obtaining Sweet Gas, Synthetic Gas, and Sulphur from Natural Gas

Figure 1:
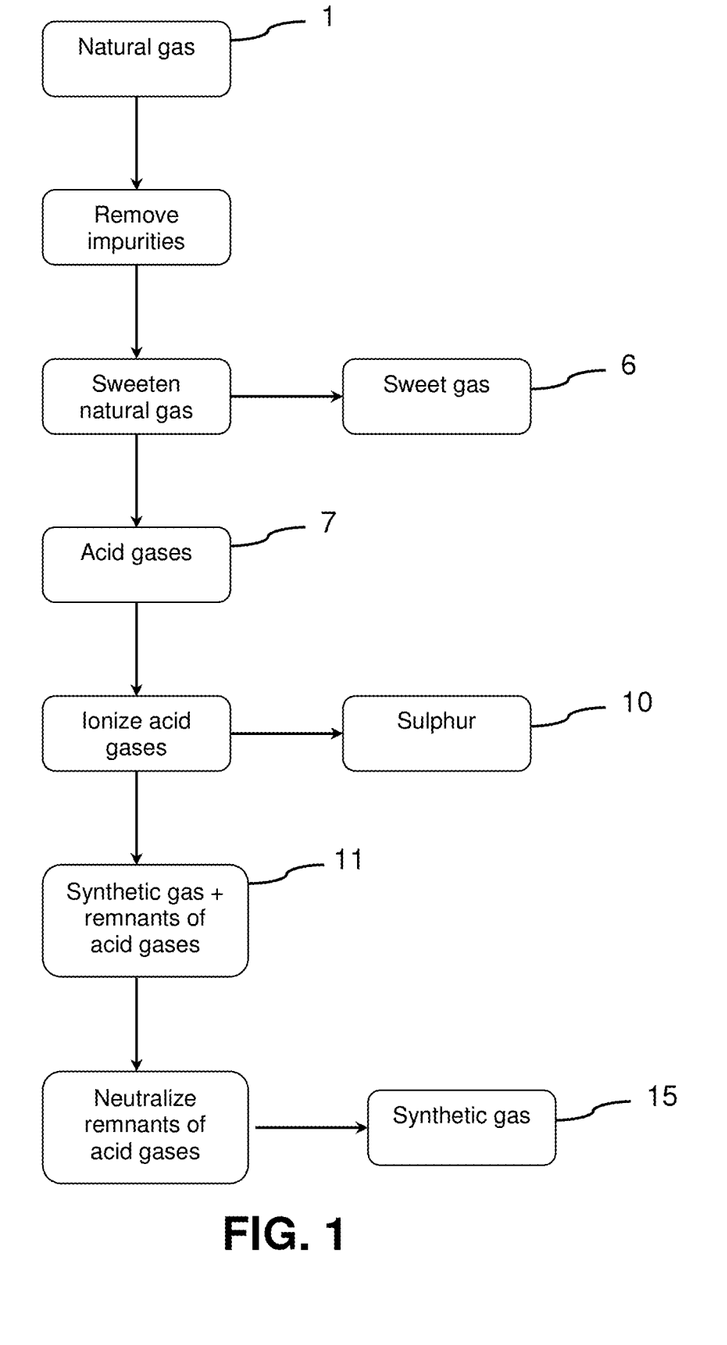
FIG. 1 shows a method for obtaining sweet gas, synthetic gas, and sulphur from natural gas according to the invention.

This invention describes a method and a system that can be used to obtain sweet gas, synthetic gas, and sulphur from natural gas. This method can be used to carry out the natural gas streams sweetening with a molar composition from 70% to 95% of $CH_4$, from 1% to 20% of $N_2$, from 1% to 20% of $CO_2$, from 1% to 10% of $H_2S$, besides having other hydrocarbons in lower proportions. The system described herein, when applied at industrial level and at the conditions that have been tested so far, is capable of processing, without limitation, from 1 to 40 million cubic feet per day (MMCFPD) of natural gas, preferably 20 MMCFPD. The method, object of this invention, consists of four steps, as shown in FIG. 1: a) removing impurities from natural gas in order to obtain pre-treated natural gas; b) sweetening the pre-treated natural gas through separation using a plurality of membranes in order to obtain sweet gas and acid gases; c) ionizing the acid gases to dissociate them into sulphur and synthetic gas with remnants of acid gases; and d) neutralizing the synthetic gas with remnants of acid gases in order to generate synthetic gas.

These steps are described in the following sections together with and with reference to FIGS. 1 to 5:

a) Removing Impurities from Natural Gas in Order to Obtain Pre-Treated Natural Gas.

Before entering this first step, the natural gas (1) is conditioned to a temperature from 35 to 50° C., and to a pressure from 65 to 100 kg/cm². The natural gas (1) contains at least one gaseous hydrocarbon, $CO_2$ and $H_2S$. The gaseous hydrocarbon is at least one from the group that includes methane, propane, ethylene, ethane, propylene, pentanes, n-butane and combinations thereof. The natural gas needs to be pre-treated before entering step b), because the gas contains contaminants that could affect the membrane system, such as water, heavy hydrocarbons, and solid particles. In order to remove impurities from natural gas, the liquids and solids present in it are separated, preferably through the use of a separator (2); This separator may be placed horizontally or vertically, or may have a spherical shape of the appropriate dimensions to achieve maximum separation of the solids and liquids present in the natural gas. The separation is achieved through centrifugal force, by gravity, by impact or a combination of them. The separator consists of at least one of the following sections: a primary separation section, a secondary separation section, a fog separation section, a liquid storage section, or a combination of them. Filtration is carried out after the separation; said filtration takes place in a coalescing filter (3) in order to completely eliminate solid and liquid contaminants (4) and obtain pre-treated natural gas (5). A coalescing filter is a metallic container, usually cylindrical in shape, subject to high pressure and is divided into at least two steps. There is a filtering element inside the container that catches solid particles and allows for the coalescence of the water particles contained in the natural gas to subsequently dispose of them through a drainage system. The process in which two phase domains with identical composition come in contact with each other to form a greater phase domain, takes place in said coalescing filter in such a way that the small water particles present in the natural gas get together in groups to form drops that can easily be separated from the natural gas.

b) Sweetening the Pre-Treated Natural Gas Through Separation Using a Plurality of Membranes in Order to Obtain Sweet Gas and Acid Gases.

The pre-treated natural gas (5) obtained in step a) is sweetened by separating it into sweet gas (6) and acid gases (7) using a plurality of membranes (8); the separation takes place by diffusing the pre-treated natural gas (5) through said membranes, which separate it into two effluents: one stream of non-permeated retained gas and the other stream of permeated gas, constituting the sweet gas (6) and the acid gases (7), respectively. The sweet gas (6) contains at least 80% of $CH_4$, less than 4 ppm of $H_2S$ and other gases, including $CO_2$, $N_2$ and gaseous hydrocarbons. The acid gases (7) consist of at least 50% of $H_2S$, at least 20% of $CO_2$; the rest is primarily $N_2$ and other hydrocarbons, mostly $CH_4$. As an option, the non-permeated retained gas (sweet gas (6)) stream passes through a second separation step using a secondary plurality of membranes (9) when the amount of $CO_2$ is greater than or equal to 1000 ppm. Sweet gas (6) and acid gases (7) are obtained at the end of this step and the sweet gas (6) is sent to be finally disposed of.

c) Ionizing the Acid Gases to Dissociate them into Sulphur and Synthetic Gas with Remnants of Acid Gases.

The acid gases (7) that were separated in step b) are ionized in order to generate a hybrid plasma where sulphur (10) and synthetic gas with remnants of acid gases (11) are obtained. Said synthetic gas is a mixture of $H_2$ and CO, the percentages of which will depend on the amount of acid gases (7) obtained in step b) at the ionization level achieved by supplying power to the plasma. Sulphur (10) is sent to be finally disposed of. Preferably, ionization is carried out inside a hybrid plasma reactor (12) that creates a thermodynamic regime that depends on the power supply source and on the electrodes used in the reactor. Preferably, the power source supplies from 1 to 2 kW of power in a pulsed high frequency configuration from 20 to 60 kHz to generate, within the hybrid plasma reactor (12), a temperature greater than or equal to 5000 K in thermodynamic equilibrium; the plasma slides and expands creating a temperature gradient within the hybrid plasma reactor (12) that decreases uniformly until it reaches an out-of-equilibrium thermodynamic regime, thus obtaining the hybrid plasma that dissociates the acid gases (7) into sulphur (10) and synthetic gas with remnants of acid gases (11).

d) Neutralizing the Synthetic Gas with Remnants of Acid Gases in Order to Generate Synthetic Gas.

The synthetic gas with remnants of acid gases (11) obtained in step c), still has residues of $CO_2$ and $H_2S$, besides some gaseous $NO_x$ and $SO_x$ produced in the hybrid plasma reactor (12), that is why there is a neutralization step that takes place in a plurality of bubbling columns (13); said columns contain a neutralizing agent (14) that the synthetic gas with remnants of acid gases (11) goes through.

Before the synthetic gas with remnants of acid gases (11) goes through, the neutralizing agent (14) has a pH from 8 to 14. After this neutralization step, the synthetic gas (15) obtained has the appropriate conditions to be used in the generation of power.

System for Obtaining Sweet Gas, Synthetic Gas, and Sulphur from Natural Gas

Figure 2:
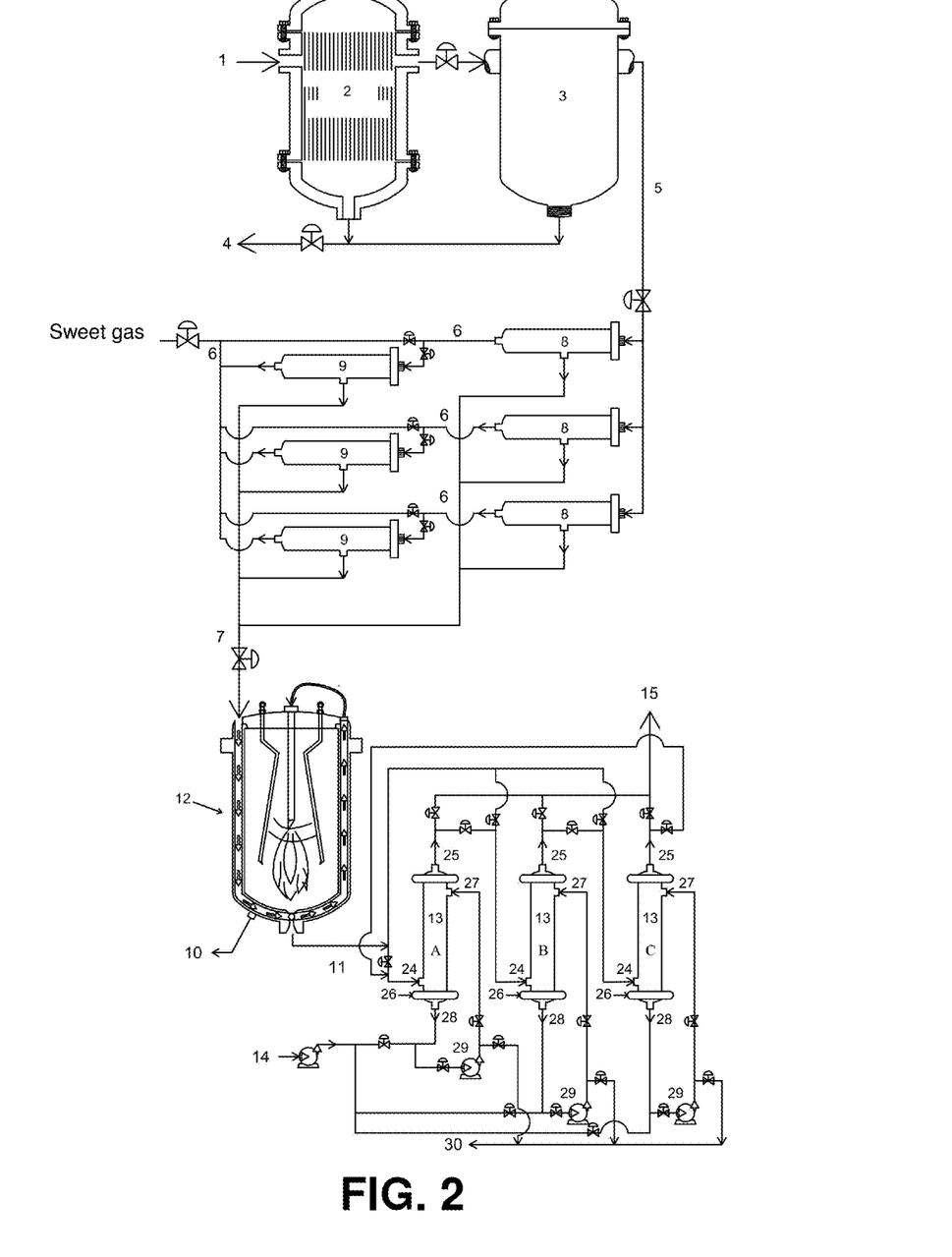
FIG. 2 shows a system for obtaining sweet gas, synthetic gas, and sulphur from natural gas according to the invention.

The system for obtaining sweet gas, synthetic gas, and sulphur from natural gas according to the invention includes: a separator (2) connected to a coalescing filter (3), which is attached to a module formed by a plurality of membranes (8) and (9) followed by at least one hybrid plasma reactor (12) and a plurality of bubbling columns (13), as shown in FIG. 2.

The natural gas stream (1) previously taken to a temperature from 35 to 50° C. and a pressure from 65 kg/cm² and 100 kg/cm² enters a separator (2) for the purpose of extracting all the liquid and solid contaminants that exist in the natural gas (1), such as water and heavy hydrocarbons, in such a way that two phases are created; one liquid phase that contains the liquid and solid contaminants, and a gaseous phase that passes through a valve that reduces its pressure to values from 40 to 65 kg/cm² and then sends it to the coalescing filter (3). The coalescing filter (3) purifies the natural gas (1) even further when the remaining liquid and solid contaminants still carried by the natural gas (1) are removed. The liquid and solid contaminants removed are taken out from the coalescing filter (3) and are later mixed in the same line with the liquid and solid contaminants extracted by the separator (2). The pre-treated natural gas (5) obtained from the coalescing filter (3) passes through a pipe line to a valve where the pressure is reduced even further to values from 3 to 40 kg/cm².

The separator (2) and the coalescing filter (3) are followed by the plurality of membranes (8) and (9) of the system, which preferably consists of tubular modules formed by films called membranes and are made of polymer-type materials that can be supported by themselves in the form of poreless films or together with other materials. These materials can be selected from a variety of polymer materials, which can be rigid or elastomeric, giving preference to those that show greater permeability to gases such as $H_2S$ and $CO_2$, when compared with other gases contained in the natural gas streams, such as methane, propane, butane (for example, in the case of polyimide, polybenzimidazole, polyamides, polyethers, polyurethanes, polyureas, and combinations with polyurethane-urea and polyamide-ether). The film or membrane to be used shall be selected from those that show an $H_2S$ and $CH_4$ separation ratio from 20:1 to 60:1 and an $H_2S$ permeability from 50 to 150 Barrer. The films or membranes made of these materials can be prepared using various methods, such as casting or by heating and compression or any other method specifically used in this field for the formation of films or membranes. The plurality of membranes (8) and (9) can be formed in various layouts or geometries; in flat membrane layouts or rolled in a spiral shape, preferably in a tubular package and with various types of supports made of material such as ceramic, metal, polymers, compounds or fabrics. In all cases, the separation of acid gases (7) is carried out by the film or membrane among those mentioned above that meets the flow characteristics and $H_2S$ separation ratio. Additionally, the membranes must show a $CO_2$ separation ratio with respect to $CH_4$ from 10:1 to 30:1 in a natural gas stream using the same process and geometry for the $H_2S$ separation, with $CO_2$ permeability from 30 to 130 Barrer. The layout of these membranes depends on the minimum capacity established and on the geometry that show the best flow and separation characteristics for $CO_2$ and $H_2S$ gases. Two gas lines come out from the plurality of membranes (8) and (9), which consists of tubular modules; one line carries the non-permeated retained gas, which is the sweet gas (6) primarily made up of $CH_4$; the other line carries the permeated gas containing mostly acid gases (7) such as $CO_2$ and $H_2S$ in addition to $N_2$ and traces of $CH_4$.

The plurality of membranes module (8) and (9) is followed by at least one hybrid plasma reactor (12), which was designed taking into account the varying operating characteristics under which the method object of this invention works. The design was made with a system of interchangeable pieces that can be easily installed.

Figure 5:
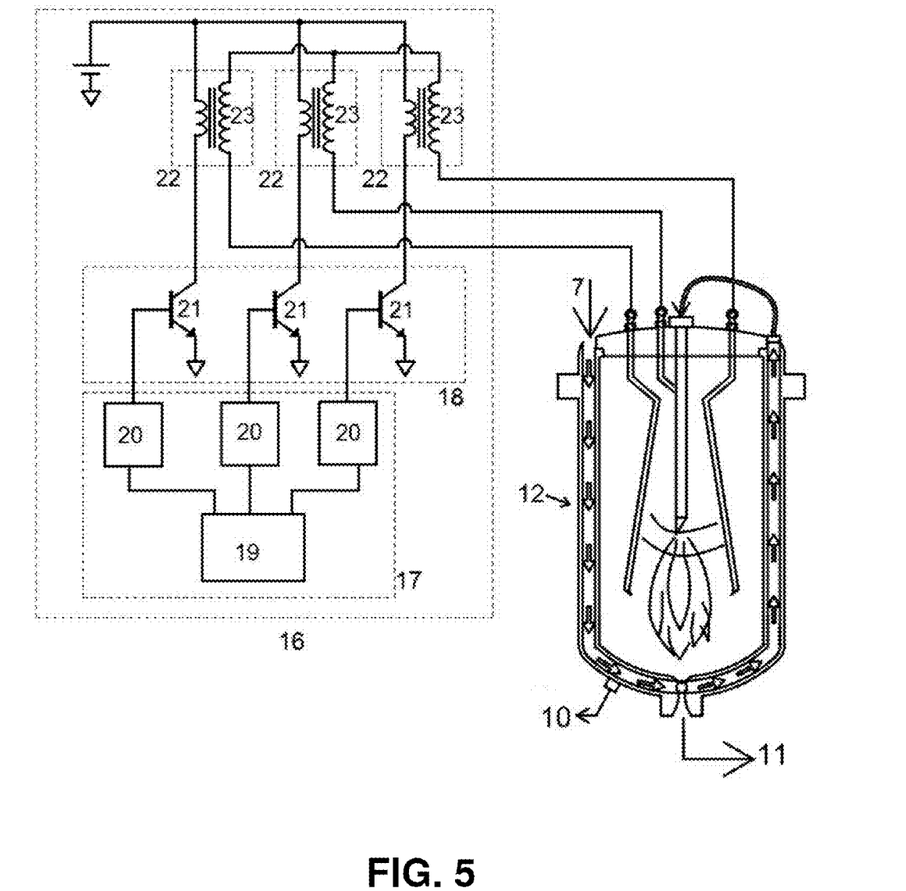
FIG. 5 shows the layout of a power source and its connection to the electrodes of a hybrid plasma reactor according to the invention.

As shown in FIG. 5, the proposed power source (16) is based on a direct current converter that changes it into a high-voltage, high-frequency pulsed signal. This converter has a control section (17) and a power section (18). The control section (17) consists of a central microprocessor (19) used to program the operating frequency. After that, several floating signal drivers (20) polarize and switch the gates of three MOS power transistors (21). The power section consists of the three MOS transistors (21) which feed three voltage step-up transformers (22) with primary and secondary sides (23), the equivalent inductance being that of the primary of each step-up voltage transformer, formed over a ferrite core (22) to work at high frequencies. The secondary (23) of each transformer is directly connected to the hybrid plasma reactor (12) electrodes The impedance adjustment has also been set in the design in order to achieve both the initial and the sustained discharges. The connection of the three secondaries (23) is of the Wye type. The power consumption of the lab prototype version plasma is 1.2 kW, while the required power for the industrial prototype version of the hybrid plasma reactor (12) can vary from 5 to 50 kW.

Said hybrid plasma reactor (12), shown in FIG. 5, is followed by a plurality of bubbling columns (13) in continuous operation and consists of at least two columns, preferably three stainless-steel columns. Each bubbling column (13) has an inlet for synthetic gas with remnants of acid gases (24) located at the bottom and an outlet for synthetic gas with remnants of acid gases (25) located at the top, through which the controlled gas flows at a rate of 0.1 to 0.5 L/min·cm² (the cm² refer to the column's cross-sectional area), preferably 0.3 L/min·cm² in order to achieve efficient contact of the neutralizing agent (14) with the synthetic gas with remnants of acid gases (11) coming from the hybrid plasma reactor's (12) outlet. Likewise, a bubbling distribution media (26) is located at the bottom of each bubbling column (13). Preferably, said distribution media shall be a duct on which a series of consecutive equidistant orifices have been drilled; the duct is rolled in a spiral shape and covers the entire base of the bubbling column (13). Likewise, each bubbling column (13) has a neutralizing agent (27) inlet located opposite to the synthetic gas with remnants of acid gases inlet (24) and a neutralizing agent outlet (28) located opposite to the synthetic gas with remnants of acid gases outlet (25). The bubbling columns (13) have different geometries at their base, which can be cylindrical, square or polygonal in shape; they are assembled in a vertical position and are closed; they have a 1:1 to 1:30 diameter-length ratio, preferably 1:25, and are connected in series as shown in FIG. 2; the bubbling columns (13) contain a neutralizing agent (14) inside with a 10% to 30% concentration by weight, preferably 15% and is recirculated by at least one pump (29) connected at the neutralizing agent's inlet (27) and the neutralizing agent's outlet (28); said neutralizing agent (14) is selected from a group that includes NaOH, LiOH, KOH, $Mg(OH)_2$, $Ba(OH)_2$, $Mn(OH)_2$, $Ca(OH)_2$ and combinations thereof, preferably $Ca(OH)_2$. Before the synthetic gas with remnants of acid gases (11) passes through, the neutralizing agent (14) has a pH from 8 to 14. At least one of the bubbling columns (13) that form the plurality of said columns is used to store the neutralizing agent (14), and is now designated as a non-operating column; it will be activated if the neutralizing agent (14) in any of the remaining bubbling columns (13) runs out as a result of the neutralization of the synthetic gas with remnants of acid gases (11) flow; the storage of the neutralizing agent exists for the purpose of securing uninterrupted operation. If the neutralizing agent (14) runs out in one of the bubbling columns (13), the flow of synthetic gas with remnants of acid gases (11) stops and is redirected to the non-operating column by a plurality of valves (29) located at the neutralizing agent's inlets (27) and the neutralizing agent's outlets (28); said non-operating column will be activated and will replace the column whose neutralizing agent (14) has run out.

When the neutralizing agent (14) comes in contact with the synthetic gas with remnants of acid gases (11), the remaining acid gases, $CO_2$ and $H_2S$, are converted into the corresponding carbonate and sulphide, depending on the neutralizing agent selected from the group that includes $Ca(OH)_2$, NaOH, LiOH, KOH, $Mg(OH)_2$, $Ba(OH)_2$, $Mn(OH)_2$ and combinations thereof, preferably $Ca(OH)_2$, in accordance with the following chemical reactions:

$CO_2 + MOH \rightarrow MCO_3 + nH_2O$ $H_2S + MOH \rightarrow MS + nH_2O$, where M is Ca, Na, Li, K, Mg, Ba or Mn, preferably Ca.

If small amounts of gaseous $NO_x$ are generated, such as nitrous oxide ($N_2O$), nitric oxide (NO), nitrogen dioxide ($NO_2$) and gaseous $SO_x$, such as sulphur dioxide ($SO_2$), they will react with the neutralizing agent (14) forming reaction products (30) such as nitrites and sulfites, respectively.

Said reaction products (30) remain in recirculation inside the plurality of bubbling columns (13). When the neutralizing agent (14) runs out, the content of the bubbling column (13) is discharged into a container. As an option, if the reaction products (30) are insoluble, they are filtered and washed, as necessary. If they are soluble, it becomes necessary to concentrate them until saturation and precipitation of solids occur, and then they are filtered and washed, as necessary. If they are insoluble, like $CaCO_3$ or $Li_2CO_3$, they are filtered and washed with hot water in order to separate the $CaCO_3$ or $Li_2CO_3$ in solid state, while CaS or $Li_2S$ remain in the filtration liquors. The $CaCO_3$ or $Li_2CO_3$ are then dried and remain available for their final use. The synthetic gas (15) (a mixture of $H_2$ and CO) is recovered and can be used as fuel for the generation of energy in accordance with the method presented in this invention.

EXAMPLES OF THE REALIZATION OF THE INVENTION

The invention will now be described with respect to the following examples, which have the sole purpose of representing the way in which the implementation of the principles of this invention is carried out. The following examples do not intend to be an exhaustive representation of the invention, or limit its scope.

Example 1

Preferred Way of Applying the Method for Obtaining Sweet Gas, Synthetic Gas, and Sulphur from Natural Gas, which is the Object of this Invention The method used to obtain sweet gas, synthetic gas, and sulphur from natural gas shown in FIG. 1, which is the object of this invention, consists of the following steps for the natural gas sweetening through polymeric membrane systems and the conversion of the resulting acid gases into high-value-added products, such as synthetic gas (mixture of $H_2$ & CO) and sulphur. This example gives details of the method's steps and their interaction with the proposed system. Following are the details:

a) Removing Impurities from Natural Gas in Order to Obtain Pre-Treated Natural Gas The natural gas stream previously conditioned to a temperature from 35 to 50° C. and pressure from 65 to 100 kg/cm² is fed to a separator. This separator extracts the contaminating liquid and solid particles that exist in the natural gas, such as water and heavy hydrocarbons, in such a way that two phases are created. The liquid phase contains the liquid and solid contaminants and goes out through the bottom part of the separator's tank. The gaseous phase flows through the top of the separator and goes through a valve that reduces the pressure to a value from 40 to 65 kg/cm² and then it is directed to the coalescing filter. The coalescing filter further purifies the natural gas by removing the remaining liquid and solid contaminants that are still carried by the natural gas. The natural gas is fed through the top side part of the coalescing filter and has two outlets. The liquid and solid contaminants are removed from the bottom part and are later mixed in the same line with the liquid and solid contaminant extracted by the separating tank. The pre-treated natural gas outlet is located at the top of the coalescing filter and then follows a pipe line to a valve where the pressure is reduced to values from 3 to 40 kg/cm² and then the pre-treated gas is sweetened.

b) Sweetening the Pre-Treated Natural Gas Through Separation Using a Plurality of Membranes in Order to Obtain Sweet Gas and Acid Gases The pre-treated natural gas that comes from the coalescing filter goes into a plurality of polymeric membranes which can be of the polyimide type, polybenzimidazole, polyamides, polyethers, polyurethane, polyureas or a combination of them with polyurethane-ureas or polyamide-ether. The plurality of membranes consists of tubular modules capable of processing, without limitation, from 1 to 40 million cubic feet per day (MMCFPD) of natural gas, preferably 20 MMCFPD. The pre-treated natural gas can be fed to the plurality of membranes at a temperature of 35° C. The plurality of membranes operates at a feeding pressure from 3.5 to 35 kg/cm², preferably at 27.1 kg/cm². The molar composition of the pre-treated natural gas is from 70 to 95% by weight of $CH_4$, from 1 to 20% by weight of $N_2$, from 1 to 20% by weight of $CO_2$, from 1 to 10% by weight of $H_2S$, preferably 83% by weight of $CH_4$, 9% by weight of $N_2$, 5% by weight of $CO_2$, 3% by weight of $H_2S$, besides having other hydrocarbons in smaller percentages. The separation process through the use of a plurality of membranes is carried out by following a solution-diffusion mechanism. The gases are first dissolved and then diffused through the polymer membrane, selectively permeating those gases having greater affinity for the plurality of membranes, which are the $CO_2$ and $H_2S$ acid gases, leaving a non-permeated residual stream enriched with $CH_4$. The plurality of membranes consists of tubular modules with two gas lines coming from them; the non-permeated retained gas that constitutes the sweet gas, primarily made up of $CH_4$, while the permeated gas stream that primarily contains acid gases like $CO_2$, $H_2S$ in addition to $N_2$ and traces of $CH_4$, is transferred to a hybrid plasma reactor.

c) Ionizing the Acid Gases to Dissociate them into Sulphur and Synthetic Gas with Remnants of Acid Gases The permeated gas stream that primarily contains acid gases like $CO_2$ and $H_2S$, in addition to $N_2$ and traces of $CH_4$, is then treated to convert said gases into higher-value-added products. The acid gases that were separated in step b) are ionized in order to generate an hybrid plasma from which sulphur and synthetic gas with remnants of acid gases are obtained.

The acid gases enter in counterflow through the hybrid plasma reactor's wall where the gases reach a temperature from 100 and 200° C. Later, this effluent goes into the hybrid plasma reactor where the gases are dissociated into their constituent elements, thus obtaining high-value-added products such as sulphur and synthetic gas (mixture of $H_2$ and CO) with remnants of acid gases. The sulphur is removed from the hybrid plasma reactor's bottom part in liquid form. The synthetic gas (mixture of $H_2$ and CO) with remnants of acid gases goes out through the bottom part of the hybrid plasma reactor, and is then transferred to a plurality of bubbling columns.

d) Neutralizing the Synthetic Gas with Remnants of Acid Gases in Order to Generate Synthetic Gas.

The synthetic gas with remnants of acid gases produced in step c) enters a plurality of bubbling columns for the purpose of neutralizing the remaining acid gases, $CO_2$ and $H_2S$.

The synthetic gas with remnants of acid gases may also contain small amounts of $NO_x$ and $SO_x$ in gaseous state. In order to complete the treatment and make use of the synthetic gas at permissible levels, the neutralization of acid gases is carried out through the use of a plurality of bubbling columns in continuous operation. The plurality of bubbling columns contains a neutralizing agent that can be $Ca(OH)_2$, NaOH, LiOH, KOH, $Mg(OH)_2$, $Ba(OH)_2$, $Mn(OH)_2$ and combinations thereof, preferably $Ca(OH)_2$.

The plurality of bubbling columns in continuous operation consists of at least two columns, preferably three stainless-steel columns. The neutralizing agent is recirculated in the downward direction, suctioning it from the bottom and discharging it at the top of the column. Based on FIG. 2, the synthetic gas with remnants of acid gases is directed through a plurality of bubbling columns in series in the following way: first, the synthetic gas with remnants of acid gases enters the first column (A) and then enters the second column (B). The gas enters through the bottom part of each column and the third column (C) becomes operational when the neutralizing agent in column (A) runs out, is unloaded or has to be reloaded with new neutralizing agent. In this case, the synthetic gas with remnants of acid gases is redirected to enter through column (B), which is still operating, and then goes to column (C). When the neutralizing agent in column (B) runs out, it is unloaded and the synthetic gas with remnants of acid gases is redirected to column (C), and then enters column (A) which has now been loaded with new neutralizing agent, and column (B) is now ready to be reloaded with new neutralizing agent. When the neutralizing agent in column (C) runs out, the operating cycle starts again.

When the neutralizing agent comes in contact with the acid gases $CO_2$ and $H_2S$, they are converted into the corresponding carbonate and sulfide, in accordance with the type of neutralizing agent selected from the group that includes $Ca(OH)_2$, NaOH, LiOH, KOH, $Mg(OH)_2$, $Ba(OH)_2$, $Mn(OH)_2$ and their combinations, preferably $Ca(OH)_2$, in accordance with the following chemical reactions:

where M is Ca, Na, Li, K, Mg, Ba or Mn, preferably Ca.

If small amounts of gaseous $NO_x$ are generated, such as nitrous oxide ($N_2O$), nitric oxide (NO), nitrogen dioxide ($NO_2$) and gaseous $SO_x$, such as sulphur dioxide ($SO_2$), they will react with the neutralizing agent forming reaction products such as nitrites and sulfites, respectively.

Said reaction products remain in recirculation inside the plurality of bubbling columns. When the neutralizing agent runs out, the content of the column is discharged into a container. As an option, if the reaction products are insoluble, they are filtered and washed, as necessary. If they are soluble, it becomes necessary to concentrate them until saturation and precipitation of solids occur, and then they are filtered and washed, as necessary. If they are insoluble, like $CaCO_3$ or $Li_2CO_3$, they are filtered and washed with hot water in order to separate the $CaCO_3$ or $Li_2CO_3$ in solid state, while CaS or $Li_2S$ remain in the filtration liquors. The $CaCO_3$ or $Li_2CO_3$ are then dried and remain available for their final use. The synthetic gas (a mixture of $H_2$ and CO) is recovered and can be used as fuel for the generation of energy as part of the process of the present invention.

Example 2

Synthesis of Polyurethane-Urea and Membrane Manufacturing

Polyurethane urea is synthesized through a method known as "two steps." In the first step, poly(ethylene oxide) having a molecular weight from 1000 to 2000 g/mol, preferably an intermediate value from 1200 to 1600 g/mol (1500 g/mol), that has been dried in advance for as long as necessary, and is made to react in a 1:2 ratio with a cycloaliphatic or aromatic diisocyanate such as 4,4'-methylene-bis(cyclo-hexyl isocyanate) (HMDI) or 2,4 tolylene diisocyanate dissolved in an adequate solvent medium with a boiling point higher than 110° C., (such as dimethyl sulfoxide (DMSO)) are placed into a three necked round bottom flask, of the type used in laboratories for chemical reactions. This solution is vigorously mixed for 5 to 10 min and later incubated at 110° C. for 3 hours in a nitrogen atmosphere. After this time, the solution of the prepolymer isocyanate is allowed to cool until it reaches room temperature. Next, as a second step, a solution containing a chain extender that contains aromatic-type amino-terminal groups with at least 30% Fluor by weight, such as (4,4-(hexafluoroisopropylidene)dianiline (HFA)) is added in a 1:1 molar ratio with respect to the poly(ethylene oxide) dissolved in 5 mL of dimethyl-sulfoxide anhydrous (DMSO) The polymerization reaction takes place by heating to a temperature from 80 to 130° C., preferably 110° C., for a 15 to 20 hour period, preferably 18 hours, in a nitrogen atmosphere using magnetic stirring.

Subsequently, the polymer solution is allowed to cool down at room temperature and is poured into 2 L of cold distilled water, stirring constantly, in order to precipitate the polymer material. Afterwards, the polymer material, in fiber form, is recovered by filtration and washed with distilled water at room temperature. Finally, the polyurethane-urea fibers are dried at room temperature for 24 hours and then at 80° C. in a vacuum until constant weight is achieved.

Figure 3:
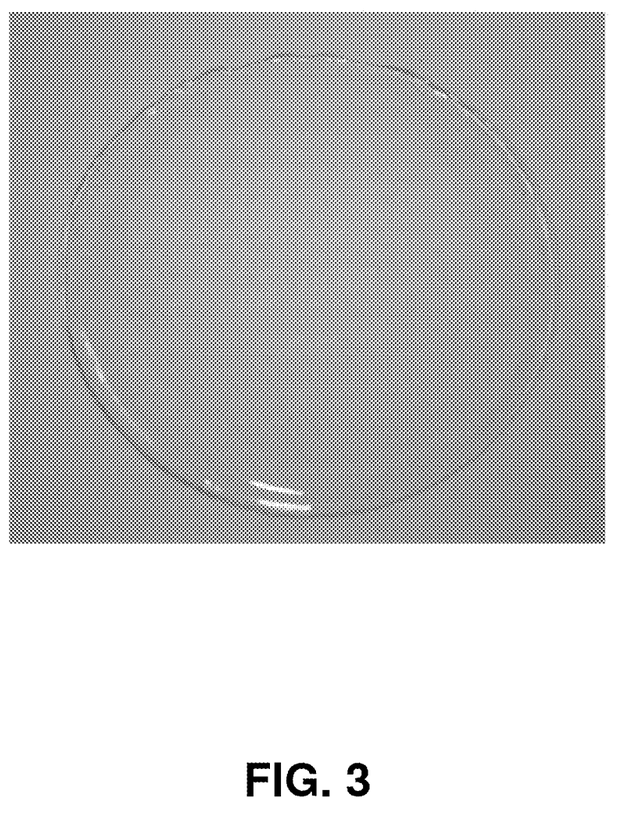
FIG. 3 shows an optic microscopy picture of a translucent polyurethane-urea membrane according to the invention.

The polyurethane-urea membrane is manufactured using the casting technique. A polymer solution at 12.5% (p/v) is prepared using the polyurethane-urea in an adequate solvent of the chloroform type, 1,2 dichloroethane or tetrahydrofuran, THF. The polymer solution is filtered using a funnel with a sintered filter to eliminate particles in suspension. The filtered solution is placed in a Teflon-coated box, which is then covered to prevent contamination with dust particles and slow evaporation of the solvent is allowed. The solvent evaporation takes place at room temperature for 12 hours; subsequently, the membrane is placed in a vacuum stove at 60° C. for 48 hours for the complete elimination of the THF. The dense polyurethane-urea membrane is shown in FIG. 3 and its dimensions are 58 cm² of area and an average thickness of 258 µm. Alternatively, supported membranes are prepared on a porous surface where the polyurethane-urea surface layer is deposited from the solution using an adequate method to achieve homogeneous distribution of the membrane once the solvent has been eliminated. Various methods can be used for this process, such as immersion of the support in the solution, or using a mechanical deposit method followed by a drying of the support surface which could be made up of porous polymers, fibers or fabric.

Example 3

Figure 4:
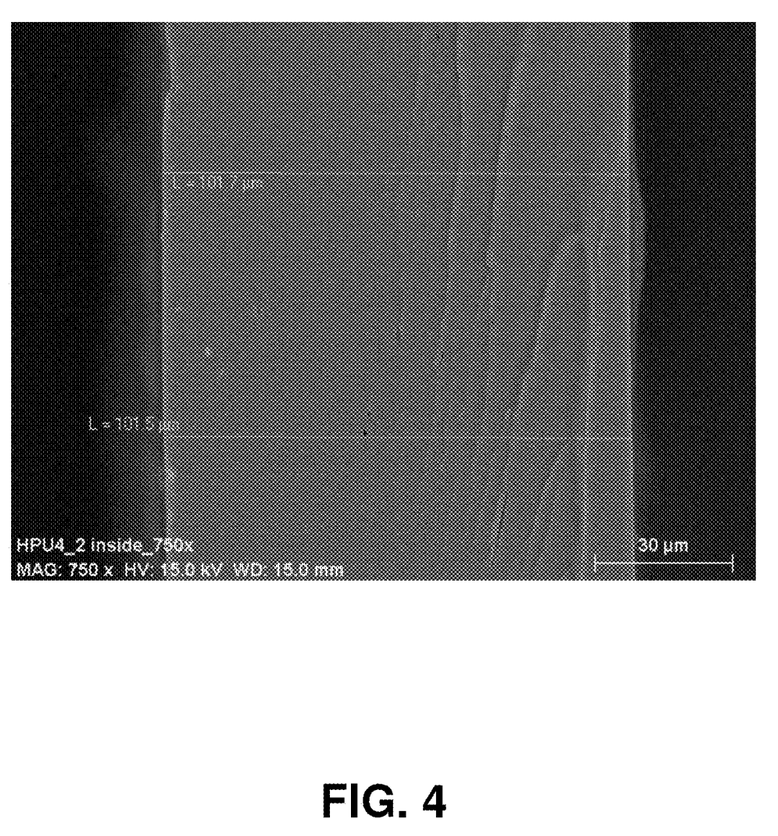
FIG. 4 shows a micrograph, obtained through Scanning Electron Microscope (SEM), of the cross-section of a polyurethane-urea type membrane according to the invention.

Characterization Using Scanning Electron Microscope (SEM) of Polyurethane-Urea Type Membranes Used for the Separation of $CO_2$ & $H_2S$ Mixed with $CH_4/CO_2/H_2S/N_2$ Gases The SEM micrograph that corresponds to the cross-section of a polyurethane-urea type membrane is shown in FIG. 4. This image was obtained with a JEOL brand microscope, model JSM-7401F. The average thickness measured using SEM for this membrane is 101.7 µm. A dense membrane free of defects and/or porosities that could interfere with the trials for the separation of $CO_2$ and $H_2S$ in a mixture of $CH_4/CO_2/H_2S/N_2$ gases can be seen in this micrograph.

Example 4

Permeability and Selectivity of Polyurethane-Urea Type Membranes in a Mixture of $CH_4/H_2S/CO_2/N_2$ Gases The permeability and selectivity properties shown by polyurethane-urea type polymer membranes are determined through the use of a gas permeation device attached to a gas chromatograph. A quaternary gas mixture was used to make the measurements with 83% molar concentration of $CH_4$; 3% of $H_2S$; 5% of $CO_2$; and 9% of $N_2$. These trials were carried out at 35° C., applying gradual pressure increments in the feeding chamber from 3.5 to 27.1 kg/cm². The permeability and selectivity test results are presented in Table 1. These results show that the polyurethane-urea type membranes show high permeability for $CO_2$ and $H_2S$ of 33.8 and 143.4 Barrer, respectively, while $CH_4$ and $N_2$ are virtually retained as they show permeabilities of 2.7 and 2 Barrer, respectively. Therefore, the polyurethane-urea type membranes are quite selective as they primarily allow the permeation of acid gases.

TABLE 1

| Gases | Permeability (Barrer) | Selectivity |
| --- | --- | --- |
| $CO_2$ | 33.8 | 12.5 |
| $H_2S$ | 143.4 | 52.7 |
| $N_2$ | 2.0 | 0.8 |
| $CH_4$ | 2.7 | 1 |

Example 5

Ionization of a $CH_4/H_2S/CO_2/N_2$ Gas Mixture Using Hybrid Plasma

The ionization process of a $CH_4/H_2S/CO_2/N_2$ gas mixture requires a 1.2 kW electric power source for its operation and is used to treat a gas flow of up to 50 LPM at atmospheric pressure. Worth mentioning is the fact that the process is continuous and does not require additional compression systems or vacuum systems. Based on the studies that were carried out, temperature profiles from 5000 to 400K can be achieved with this energy density, thus allowing the elimination of thermal inertia in the treated species and their possible recombination. The degradation percentages achieved under these operating conditions are for $H_2S>90\%$ and for $CO_2>58\%$.

Example 6

Evaluation of $CO_2$ Neutralization in Bubbling Columns with $Ca(OH)_2$ as the Neutralizing Agent The trials carried out to evaluate the efficiency of acid gas neutralization in step d) were carried out through neutralization by acrylic and PVC bubbling columns, 7.2 cm in diameter and 186 cm in height, using 7 to 10 L of neutralizing agent. The concentration of the neutralizing agent varies from 10% to 30% by weight, preferably 15% for the case of $Ca(OH)_2$.

The operation took place in closed column systems, adjusting a controlled flow, preferably at 18 L/min of neutralizing agent, and 1 L/min in the $CO_2$ stream, in order to improve the contact between the liquid and the gas, thus making neutralization more efficient. There is a certain volume of air inside each column that is recirculated during the process; 1 L/min of $CO_2$ is injected into the air stream; the air dilutes the $CO_2$ stream to a $CO_2$/air ratio from 1/10 to 1/12 by volume, since the air was recirculated at a rate of 10-12 L/min through the column. Three procedures were selected to monitor the $CO_2$ neutralization reaction with $Ca(OH)_2$ as the neutralizing agent: i) pH measurement, ii) temperature measurement, and iii) pressure measurement in the bubbling column.

i) pH Measurement:

In the beginning, the neutralizing agent has a pH of 13. As the neutralizing reaction progresses, the pH decreases until it reaches a value of 7; this happens when all the $Ca(OH)_2$ neutralizing agent has been consumed, as can be observed in Table 2.

ii) Temperature Measurement

During the neutralization reaction, the temperature increases from 23.9° C. to 30.6° C. as a function of the reaction time. Therefore, if a constant temperature or a decrease in temperature is detected, that is evidence that the neutralizing agent has been used up completely (Tablet).

iii) Pressure Measurement in the Bubbling Column:

The pressure in the bubbling column is negligible or nil while the neutralization reaction is taking place. The pressure increases once there is no more neutralizing agent. This is an indication that the acid gases, $CO_2$ in this case, are not being consumed (Table 2).

TABLE 2

| Time (min) | Temperature (° C.) | Pressure (psig) | pH |
|---|---|---|---|
| 0 | 23.9 | 0 | 13 |
| 16 | 24.5 | 0 | 13 |
| 31 | 25.6 | 0.3 | 13 |
| 45 | 26.8 | 0.5 | 13 |
| 60 | 27.4 | 0.5 | 13 |
| 75 | 28.3 | 0.5 | 13 |
| 90 | 28.9 | 0.5 | 13 |
| 105 | 29.3 | 1.5 | 13 |
| 120 | 29.7 | 1.5 | 13 |
| 135 | 30.1 | 1.5 | 13 |
| 150 | 30.3 | 3 | 10.5 |
| 157 | 30.6 | 5 | 7.5 |
| 160 | 30.7 | 7 | 7 |

Additionally, it has been observed that an increase in the $CO_2$ feeding pressure favors the speed of the neutralization reaction, evidenced by a reduction in the time needed to consume all of the neutralizing agent (Table 3).

TABLE 3

| $CO_2$ Pressure (psig) | Neutralization time (hours) |
|---|---|
| 5 | 3.05 |
| 12 | 2.68 |

Advantages of the Invention

Elastomeric rubber type membranes with high content from the amine, amide, urea and/or urethane type groups will be developed in this invention. Said membranes interact favorably with $CO_2$. Membranes containing polyethers (ethylene oxides), with medium chains from 1000 to 2000 units of molecular mass would be particularly appropriate. This will increase the interaction with $CO_2$ and, because of the chain size, reduces the possibility of crystallization, thus achieving greater gas flow, which must be connected to aromatic chain extenders instead of aliphatic ones to prevent acid attack and maintain their properties, like the ones presented by polyurethane-urea copolymers with fluorinated aromatic chain extenders in the section that corresponds to urea, specifically developed for this invention.

In this invention, the acid gases stream contains less than 30% molar of $CH_4$, making the sweetening process more efficient. Likewise, the process described in this invention offers the possibility of transforming the acid gases stream into a synthetic gas steam and sulphur.

This invention includes the removal of both acid gases with highly selective membranes for $CO_2$ and $H_2S$; having the additional advantage of generating sweet gas, synthetic gas, and sulphur; this prevents the contamination of the environment produced by other existing processes, because of the release of $CO_2$ & $SO_2$ to the atmosphere.

Worth mentioning is the fact that this invention not only allows for the natural gas sweetening, but it also offers the conversion of acid gases into value added products by using a hybrid plasma reactor. The plasma offers at least three basic properties that make it attractive for other applications: (i) The temperature and energy density greatly exceed those of conventional techniques, (ii) Capacity to produce active species with reaction times well below those of conventional techniques; (iii) In the case of out-of-thermal-equilibrium plasmas (NETL) the active species have high energy concentrations, even when the plasma volume remains at room temperature. Worth mentioning are the following facts that: i) the plasma's thermal inertia inside a reactor is virtually nil; ii) the material is uniformly heated; iii) electromagnetic forces push the plasma towards the center of the reactor, and iv) the radiation energy can be used. Once the temperature exceeds 3000° C., the capacity to transfer energy is greatly increased as a function of the plasma gas used; this increases the speed at which chemical reactions take place, something that cannot occur at lower temperatures.

Based on what we have said before, plasma is offered as an alternative to be applied in different degradation processes, such as the treatment of solvents used in the industry and in paints, used oils, dielectric oils that contain PCBs (polychlorinated biphenyl) and their containers (capacitors and transformers), halogenated chemical compounds, CFCs (chlorofluorocarbons), pesticides, resins, and adhesives, among others. Recently, and with this invention, plasma has been applied in the treatment of acid gases like $CO_2$ and $H_2S$.

The high energy density and the low plasma inertia can be used to break molecular bonds of acid gases obtaining constituent elemental particles (like hydrogen), energy gases like synthetic gas (syngas=$H_2$+CO), and inert solids like sulphur and carbon, as products.

Just like this invention produces sulphur and synthetic gas from the mixture of acid gases ($CO_2$/$H_2S$) via hybrid plasma, this invention also includes the integration of hybrid plasma to natural gas sweetening modules through the use of membranes. This offers several advantages over existing technologies regarding the treatment of $H_2S$ and $CO_2$ with different plasma discharges.

Even though the invention has been described with reference to specific descriptions, said descriptions are not intended to be construed in a restrictive sense. Various modifications to the elements described, as well as alternate elements of the invention, will be obvious for people who are experts in the technique regarding the description of the invention. People who are experts in the technique should be able to see that the described conception and specific realization could be easily used as a basis to modify or design other structures to achieve the same purposes as this invention. People who are experts in the technique shall also take into account that said equivalent configurations do not depart from the spirit and scope of the invention, as established in the attached claims.

Consequently, it is considered that the claims cover any and all said modifications or configurations that fall within the true scope of the invention.

The invention claimed is:

1. A continuous method for obtaining sweet gas, synthetic gas, and sulphur from natural gas, comprising the steps of:
    removing impurities from said natural gas by separating liquids and solids present in said natural gas through the use of a separator, and removing liquid and solid contaminants from said natural gas by filtering said natural gas in a coalescing filter for obtaining pre-treated natural gas;
    sweetening said pre-treated natural gas through a separation using a plurality of membranes by diffusing said pre-treated natural gas through said membranes for obtaining sweet gas and acid gases, and sending said sweet gas to be finally disposed of;
    ionizing said acid gases at atmospheric pressure in a hybrid plasma to dissociate the acid gases into sulphur and synthetic gas with remnants of acid gases, and sending said sulphur to be finally disposed of; and
    neutralizing said synthetic gas with remnants of acid gases for generating synthetic gas, by passing said synthetic gas with remnants of acid gases through a plurality of bubbling columns containing a neutralizing agent with a pH from 8 to 14, a concentration from 10% to 30% by weight, wherein said synthetic gas with remnants of acid gases passes through said bubbling columns in counterflow with respect to said neutralizing agent.

2. The continuous method of claim 1, wherein before the step of removing impurities from said natural gas for obtaining pre-treated natural gas, said natural gas is taken to a temperature from 35 to 50° C. and to a pressure from 65 to 100 kg/cm$^2$.

3. The continuous method of claim 1, wherein said natural gas comprises at least one gaseous hydrocarbon, $CO_2$ & $H_2S$; said gaseous hydrocarbon is selected from a group consisting of methane, propane, ethylene, propylene, penthanes, n-butane and s-butane.

4. The continuous method of claim 1, wherein the step of sweetening said pre-treated natural gas through a separation using a plurality of membranes for obtaining sweet gas and acid gases further includes the step of passing said sweet gas through a second separation when said sweet gas contains greater than or equal to 1000 ppm of $CO_2$.

5. The continuous method of claim 1, wherein said sweet gas comprises:
    at least 80% of $CH_4$; and
    less than 4 ppm of $H_2S$ and selected gases from a group consisting of $CO_2$, $N_2$, hydrocarbons and combinations thereof.

6. The continuous method of claim 1, wherein said acid gases comprise:
    at least 50% of $H_2S$;
    at least 20% of $CO_2$; and
    at least 30% of $N_2$ and $CH_4$.

7. The continuous method of claim 1, wherein said synthetic gas comprises a mixture of $H_2$ and CO.

8. The continuous method of claim 1, wherein said neutralizing agent is selected from a group consisting of KOH, NaOH, LiOH, $Mg(OH)_2$, $Ba(OH)_2$, $Mn(OH)_2$, $Ca(OH)_2$ and combinations thereof.

9. The continuous method of claim 1, wherein said step of neutralizing said synthetic gas with remnants of acid gases for generating synthetic gas further comprises the steps of:
    filtering and washing with hot water insoluble reaction products in solid state generated in the reaction of said synthetic gas with remnants of acid gases with said neutralizing agent; and
    drying said insoluble reaction products to be finally disposed of.

10. The continuous The method of claim 1, wherein said synthetic gas with remnants of acid gases further contains remnants of $CO_2$, $H_2S$, $NO_x$ and $SO_x$.

* * * * *